Patented Oct. 23, 1928.

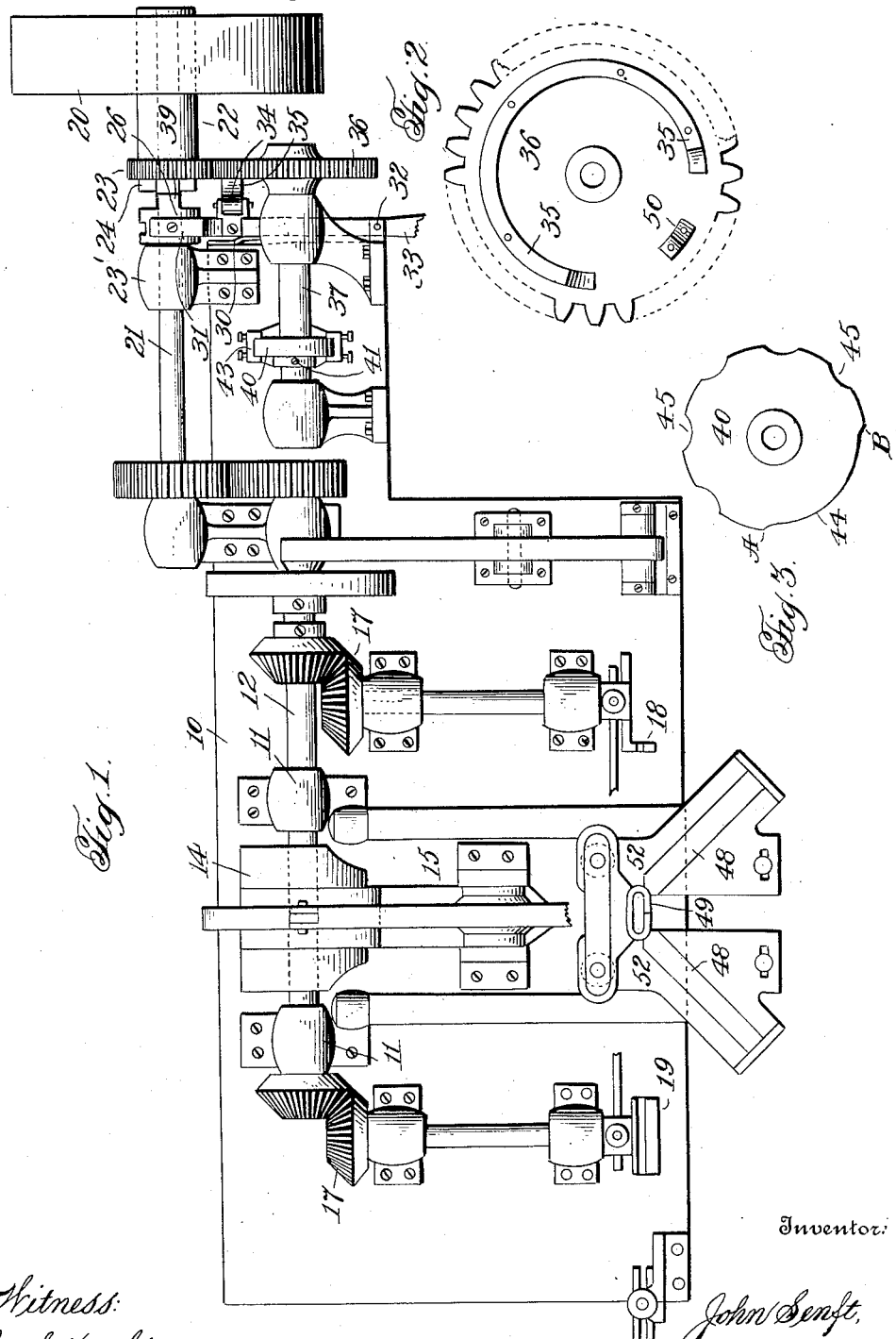

1,688,883

UNITED STATES PATENT OFFICE.

JOHN SENFT, OF YORK, PENNSYLVANIA, ASSIGNOR TO UNITED STATES CHAIN AND FORGING COMPANY, OF PITTSBURGH, PENNSYLVANIA, A CORPORATION OF PENNSYLVANIA.

ELECTRIC CHAIN WELDER.

Application filed June 18, 1924, Serial No. 720,766. Renewed August 21, 1928.

This invention relates to the art of making welded articles of various kinds, particularly the making of chains, and has for its principal object the production of a method of welding the links of a chain in such fashion or manner as to increase materially the quality of the finished chain.

A further object of the invention is the production of apparatus for carrying out the method of welding chain links just described. A still further object of the invention concerens itself in the production of a simple and efficient mechanism admirably adapted to be attached to well-known types of electric welders without material alteration of the welder so as to apply the fundamental principles of the present invention to such welder with consequent increase in the quality of the work produced.

In the drawings—

Figure 1 is a plan view of an electric welder of well-known type to which is attached the mechanism for carrying out the invention;

Fig. 2 is a view of the gear on the current control shaft;

Fig. 3 is an edge view of the cam for making and breaking the welding circuit.

The welding machine proper shown in Figure 1 is of a well-known and old type including a bed 10, having thereon bearings 11, for the central shaft 12, which, through the cam 14, controls the operation of the swaging and trimming mechanism 15, and through the beveled gears 17 controlling the chain feeding and advancing means 18 and 19 and the other usual mechanisms of a welder of this type.

Power is supplied to the welder through the pulley 20, loose on the main shaft 21, and having a hub 22, provided with a pinion 23 and clutch mechanism 24. The other half of the clutch, here numbered 26, is splined on the main shaft 21, which is as customary, mounted in bearings 23 on the bed 10 of the machine.

A spring 30 normally holds the clutch elements 24 and 26 in engagement, so that the pulley 20 revolves the main shaft 21. The yoke 31, pivoted at 32, is provided with a handle 33, so that the clutch can be manually disengaged whenever desired, and in addition, the yoke lever carries a roller 34, which lies in the path of a lug 35, adjustably mounted on a gear 36 fast on the auxiliary shaft 37 and meshing with the pinion 23, which constantly revolves with the drive shaft, which is the hub 22, preferably integral with both the pulley and the pinion.

When the lug 35 strikes the roller 34, the clutch element 26 is moved to the left, as seen in Figure 1, and the clutch halves disengage against the tension of the spring 30, which cannot restore the clutch elements to position to connect the drive and driven shafts 22 and 21, since the vertical faces of the two clutch elements are in engagement with one another. Continued rotation of the clutch element 24, however, soon brings the slot into position to permit entry of the key 39 of the yoke controlled clutch member 26, whereupon the main shaft 21 is driven directly from the pulley 20.

The control for the welding current, which is preferably of the make and break type, is controlled directly from the main drive shaft, here shown as the hub 22. I find it convenient to make this of the cam operated type, using the cam 40, as illustrated in Figure 3, which is secured to the shaft 37 by means of the set screw 41, just above the make and break elements 43.

Beginning at the point A in Figure 3, the cam depresses the upper contact member into contact with the lower one, and supplies current to the welder until the point B is reached, when, due to the lowered radius of the arc 44, the circuit is broken and no current is furnished the welder through this angle of revolution. The small depressions 45, in the cam 40, are optional, but I find them highly advantageous. These depressions 45 serve to break repeatedly the circuit during the welding cycle extending from A to B. They are here shown as five in number, which would operate to supply current to the electrodes 48 engaging the link 49 six separate times during welding with an entire break of the current between such periods. This operation is not entirely new, per se, but is advantageous in that the breaking of the current during the welding insures a more uniform joint, and entirely eliminates arcing inside of the metal.

The size of the gear 36 is determined by the size of the chain being welded, and I prefer to make these gears 36 of different sizes to provide a ratio between the shafts 22 and 37 of from two to one for a quarter inch, or a $\frac{9}{32}$ inch link up to an 8 to 1 ratio; for example, for a half inch link, this being the largest size I have welded with the machine up to the present time. In the small sizes the lug 35 may be very short, since its sole function in the small sizes is to separate the two clutch halves for just sufficient time to allow their proximate vertical faces to ride on one another; but when welding larger sized chains, I use the larger ratio for the gear 36 and elongate the lug 35 to the desired angle. In Figure 2, for example, I have shown the lug as extending through 270°. The lug 50 is spaced somewhat from the end of the longer lug 35, and is similar in function, as it strikes the roller 34, throws out the clutch, and stops the machinery, other, of course, than the pulley 20, pinion 23, gear 36, and the mechanism of the auxiliary shaft 37, these latter constantly revolving at all times.

The operation of the machine is as follows: The pulley 20 is put in operation by shifting the belt from the idle pulley (not shown) to it, and rotation of this pulley sets in motion the auxiliary shaft 37 and the mechanism connected therewith. The attendant now releases the handle 33 from its latch and allows the spring 30 to throw in the clutch, starting the welding mechanism which, at this time, has a link 49 between the holding means or jaws 52, which are of the usual and well known type.

The various cams of the welder are now all in dwell position. The lug 35, however, is now in position to strike the roller 34, which it does, separating the clutch halves for as many revolutions of the drive shaft 22 as are covered by the length of the lug 35. During this period the welding current is constantly on, save for the momentary breaking of the current by the passing of the depressions 45 on the relatively slowly revolving auxiliary shaft 37. Upon completion of the weld, the clutch elements are in position to mesh with one another, connecting the drive and driven shafts of the welder, which now resume operation, the first step being to close the jaw of the so-called hammer which swages and trims the welded joint. Up to the present time, all machines of every type have instantly, upon completion of the swaging operation, released the link from the holding means 52 and advanced the chain by means of the mechanisms 18 and 19, thus placing the freshly welded link under tension.

In the machine illustrated embodying the invention, the lug 50 is so placed as again to disconnect the drive and driven shafts immediately upon completion of the swaging operation and before the chain advancement means have started to operate. The lug 50, like the lug 35, may be made of any desired angular length, and it serves to hold the entire mechanism of the welder from operation for a desired period after completion of the weld. I find that this dwell or rest of the link very materially improves the quality of the finished chain, and quite appreciably increases its dead weight strength, as well as its ability to withstand sudden or repeated sharp strains. In a number of destructive tests of chains made with a rest period immediately after completion of the weld, I have found they invariably broke at a point other than the weld; whereas, if the rest is not given, the chain will frequently break right through the joint.

The period of rest given to each individual link does, it is true, decrease the pound production per machine per hour, but at the same time, the increase in strength and quality far outweighs the lowered production. By allowing the period of rest, each individual link is held under compression by the holders or jaws and the therein contained electrodes 48, and this allows the heat from the joint to pass to the straight side of the link and to make the temperatures on the two sides of the link more nearly uniform, so that the tension strain in advancing the chain is no longer borne entirely by the newly welded joint.

The lug 50 has now disengaged itself from the roller 34, so that, as soon as the clutch elements 24 and 26 are in proper angular relation to mesh, the welding mechanism starts again and performs its usual cycle, the jaws open, and the feeding mechanism advances the chain to bring the next link to be welded into position between the jaws. The jaws now close, and the next cycle is begun, commencing with the turning on of the welding current at A of the cam simultaneously with the throwing out of the clutch by the initial point of the lug 35.

I claim:

1. In an automatic electric chain welder, means for holding a chain link while it is being welded and for advancing the chain after each weld to bring an unwelded link to welding position, a drive shaft, means for supplying welding current to the link to be welded, and means automatically operated from said last mentioned means for automatically connecting said holding and advancing means to said drive shaft, and for automatically disconnecting said holding and advancing means from said drive shaft.

2. In an automatic electric chain welder, a constantly rotating drive shaft, a constantly rotating driven shaft, an intermittently rotating central shaft, means connected with said central shaft for holding a chain link while it is being welded and for advancing the chain after each weld to bring an unwelded link in the welding position, means connected to the driven shaft for supplying welding current to the link to be welded, and means controlled by the operation of the driven shaft for automatically connecting and disconnecting said drive and central shafts.

3. In an electric welder, means for holding a chain link while it is being welded and for advancing the chain after each weld to bring an unwelded link to welding position, a drive shaft, means automatically operated during each welding cycle for connecting and disconnecting said holding and advancing means and said drive shaft, and means for supplying welding current to the link to be welded, said means for supplying current being directly governed by said drive shaft and entirely independent of said holding and advancing means.

4. In an electric welder for chains, link holding means, advancing means, means for passing welding current through a link of the chain, swaging and trimming means, means for initially operating said advancing means after the swaging and trimming means are at rest whereby the swaged link is allowed to cool in welding position before being subjected to the tension of the advancing motion.

5. In an electric welder for chains, link holding means, advancing means, means for passing welding current through a link of the chain, swaging and trimming means, means for initially operating said advancing means after the swaging and trimming means are at rest and while the link is held in said holding means, whereby the welded link is allowed to cool in welding position before being subjected to the tension of the advancing motion.

6. In an electric welder, means for welding a link of a chain, means for advancing the chain to bring a second link into welding position, and means for rendering the welding and advancing means inoperative after completion of each welding operation and for automatically restoring said means to operation after the welded link has cooled to the desired degree.

7. The combination in an electric welder, having means for holding a link, means for conducting current through said link to produce a welding temperature, means for swaging the link, means for releasing the holding means, and means for removing said link from said holding means upon release of said link; of means interposed in said mechanism for causing same to dwell immediately after swaging and to resume the cycle after the link has cooled for a predetermined time to increase the quality and strength of the link before subjecting it to the tension of the advancing step.

8. The combination with an electric chain welder having a drive shaft, a driven shaft and a clutch connecting the two shafts, of an auxiliary shaft directly and constantly driven by said drive shaft, an electric control on said auxiliary shaft for supplying welding current to the welder, and means operated from said drve shaft for controlling the operation of said clutch.

9. The combination with an electric welder having a drive shaft, a driven shaft and a clutch connecting said shafts, of constantly rotated means for operating said clutch to disconnect said shafts at predetermined intervals, means operable after a predetermined angular rotation of the drive shaft to operate the clutch to connect said shafts, and means independent of said driven shaft and directly controlled by the drive shaft for supplying welding current to said welder.

10. The combination with an electric welder having a drive shaft, a driven shaft and a clutch connecting said shafts, of constantly rotated means for operating said clutch at regular intervals to disconnect said shafts for a predetermined number of revolutions of the drive shaft, means operable after release of the clutch from said constantly rotated means for re-connecting the drive and driven shafts.

11. The combination with an electric welder having a drive shaft, a driven shaft and a clutch connecting said shafts, of constantly rotated means for operating said clutch at regular intervals to disconnect said shafts for a predetermined number of revolutions of the drive shaft, means operable after release of the clutch from said constantly rotated means for re-connecting the drive and driven shafts, and means independent of the driven shaft for controlling the supply of welding current to the welder.

12. An electric welder of the type employing link holding means, current carrying electrodes engaging a held link to pass welding current through the link joint, swaging means, chain advancing means, means for causing a dwell of the mechanism from the time the welding current is supplied to a point simultaneous with the swaging operation without disconnecting the mechanism from its source of power: characterized by the provision of additional means for disconnecting the mechanism from its source of power for a predetermined time during each welding operation and for retaining each link in compression between the electrodes immediately after swaging for a transfer of heat from the weld to the cooler portion of the link before subjecting the link to the tension of the chain advancing means.

13. The art of welding a chain which consists in supporting the unbroken side of a link, firmly pressing the two ends of the link together and toward the unbroken side of the link, passing welding current thru the ends of the link for a definite predetermined time, swaging the joint, and in retaining the welded link in said firmly held position with the back of the link supported against flexure or bending for a definite predetermined time before releasing it to advance the chain to weld a successive link, whereby heat will flow from the joint to the unwelded side so that the temperature of the two sides of the link may be more nearly uniform, and whereby tension in the welded side is reduced to a minimum.

JOHN SENFT.